United States Patent
Otanez

(10) Patent No.: US 9,261,187 B1
(45) Date of Patent: Feb. 16, 2016

(54) PRESSURE STAGING IN A CONTINUOUSLY VARIABLE TRANSMISSION

(71) Applicant: GM GLOBAL TECHNOLOGY OPERATIONS LLC, Detroit, MI (US)

(72) Inventor: Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/504,696

(22) Filed: Oct. 2, 2014

(51) Int. Cl.
| | |
|---|---|
| *F16H 61/662* | (2006.01) |
| *F16H 59/14* | (2006.01) |
| *F16H 59/42* | (2006.01) |
| *F16H 59/68* | (2006.01) |
| *F16H 61/00* | (2006.01) |

(52) U.S. Cl.
CPC .......... *F16H 61/66272* (2013.01); *F16H 59/14* (2013.01); *F16H 59/42* (2013.01); *F16H 59/68* (2013.01); *F16H 61/0021* (2013.01); *F16H 2059/683* (2013.01)

(58) Field of Classification Search
None
See application file for complete search history.

(56) References Cited

U.S. PATENT DOCUMENTS

| | | | | |
|---|---|---|---|---|
| 8,105,191 B2* | 1/2012 | Toyoda | ............. | F16H 61/66259 474/12 |
| 2004/0063538 A1* | 4/2004 | Yamamoto | ........ | F16H 61/66259 477/45 |
| 2012/0329588 A1* | 12/2012 | Iraha | ................ | F16H 61/66259 474/11 |

* cited by examiner

*Primary Examiner* — Erin D Bishop
(74) *Attorney, Agent, or Firm* — Quinn Law Group, PLLC

(57) ABSTRACT

A vehicle includes an engine, a continuously variable transmission (CVT), and a controller. The CVT has an output shaft, a primary pulley connected to and driven by the engine, a secondary pulley connected to the output shaft, and a belt. The pulleys each have mating halves with conical faces defining a gap in which the belt is positioned. Actuators act on one of the halves of the primary and secondary pulleys in response to a respective primary and secondary pressure. The controller detects a desired CVT ratio change in response to control inputs and determines a required shift force for achieving the desired ratio change. The controller also determines whether a calibrated rate of change is achievable. The controller adjusts the primary and/or secondary pressures when the calibrated rate is not achievable, including transmitting a pressure command to at least one of the primary and secondary actuators.

18 Claims, 3 Drawing Sheets

PRESSURE STAGING IN A CONTINUOUSLY VARIABLE TRANSMISSION

TECHNICAL FIELD

The present disclosure relates to pressure staging in a continuously variable transmission.

BACKGROUND

A continuously variable transmission (CVT) is a type of power transmission that is capable of achieving infinite variability between its highest and lowest possible speed ratios. Unlike conventionally geared transmissions that use one or more planetary gear sets and multiple rotating and braking clutches to establish a desired discrete gear state, a CVT instead uses a variable-diameter pulley system or variator to transition anywhere within a calibrated range of speed ratios. The variator typically includes two pulleys interconnected via a chain or belt. The belt rides in a gap defined by conical faces of mating halves of the pulleys. One of the pulleys is typically connected to an engine crankshaft and thus acts as a driving/primary pulley. The other pulley is connected to the output shaft of the CVT to act as a driven/secondary pulley. One or more gears or planetary gear sets could be used on the input and/or output side of the variator.

In order to vary the speed ratio, a shift force is applied via one or more actuators to the primary and/or secondary pulleys. The shift force effectively squeezes the pulley halves together to change the width of the gap between the conical faces. Variation in the gap size, which is also referred to as the pitch radius, causes the belt to ride higher or lower within the gap. This in turn changes the effective diameters of the pulleys and, as a result, changes the speed ratio.

A CVT is a relatively efficient transmission design largely due to the variable speed ratio capability and relative structural simplicity as described above. However, the performance of a CVT may remain less than optimal in certain respects. For instance, a CVT typically transitions within its allowable range of speed ratios without providing much in the way of the physical and audible "shift feedback" typically provided to a driver during shifting of a conventional automatic transmission. Likewise, some CVT speed ratio changes may take an extended amount of time to complete in comparison to an automatic transmission shift. Such factors can adversely affect the subjective responsiveness and drive quality of a CVT-equipped vehicle.

SUMMARY

A vehicle is disclosed herein that includes an internal combustion engine, a continuously variable transmission (CVT), and a controller. The CVT includes a belt, i.e., a closed loop of rubber or metal, a chain, or other suitable closed loop/endless drive structure, and primary and secondary pulleys. The belt is positioned in a gap defined by conical faces of mating portions/halves of the pulleys. The pulley halves are selectively compressed or squeezed together via an actuator. The CVT may be supplied by line pressure and the primary and secondary actuators may be powered via primary and secondary pressure, respectively, e.g., hydraulic fluid circulated under pressure via a fluid pump.

In an example embodiment, line pressure and secondary pressure are equal such that any increase in line pressure requires an equal increase in the secondary pressure. Thus, the primary pressure to the primary pulley must be changed to maintain a given gear ratio in such an embodiment. In an alternative embodiment, the primary and secondary pressures are set independently of line pressure. Both embodiments can be handled via the method set forth herein.

In general terms, the controller executes pre-recorded code or logic to stage a shift force of the CVT prior to executing a desired ratio change. That is, a calibrated duration prior to reaching a calibrated shift line, i.e., just before the CVT begins to execute a shift or speed ratio change to a desired speed ratio, the controller determines if the desired speed ratio change is achievable under the existing pressure conditions at a calibrated change rate. The desired speed ratio may be determined by control parameters such as vehicle speed, present torque request, requested gear state, and the like, as is known in the art. If the available shift force is insufficient, the controller searches a calibrated primary and secondary force relationship for the CVT being controlled to determine if operating under a higher or lower torque capacity ratio would allow the ratio change to occur at the desired rate. If so, the controller adjusts the primary and/or secondary pressures ahead of the speed ratio change and proceeds with the speed ratio change.

In an example embodiment, the vehicle includes an internal combustion engine having a crankshaft. The vehicle further includes a controller and a CVT. The CVT has an output shaft, a primary pulley connected to and driven by the crankshaft, a secondary pulley connected to the output shaft, and a belt. The primary and secondary pulleys each have mating halves with conical faces defining a variable-width gap, with the belt positioned in the defined gap. The CVT also includes first and second actuators acting on a respective one of the halves of the primary and secondary pulleys, with the primary and secondary actuators responding to the respective primary and secondary pressures.

The controller, which is in communication with the first and second actuators, is programmed to detect a desired ratio change of the CVT in response to a set of control inputs. The is controller is also programmed to calculate a required shift force for the desired ratio change and determine if the desired ratio change is achievable at a calibrated desired rate based on the calculated required shift force. The controller adjusts the primary and/or secondary pressure when the determined calibrated rate is not achievable, which may occur by transmitting a pressure command to at least one of the primary and secondary actuators.

The above features and advantages and other features and advantages of the present disclosure are readily apparent from the following detailed description when taken in connection with the accompanying drawings.

DETAILED DESCRIPTION

Figure 1:
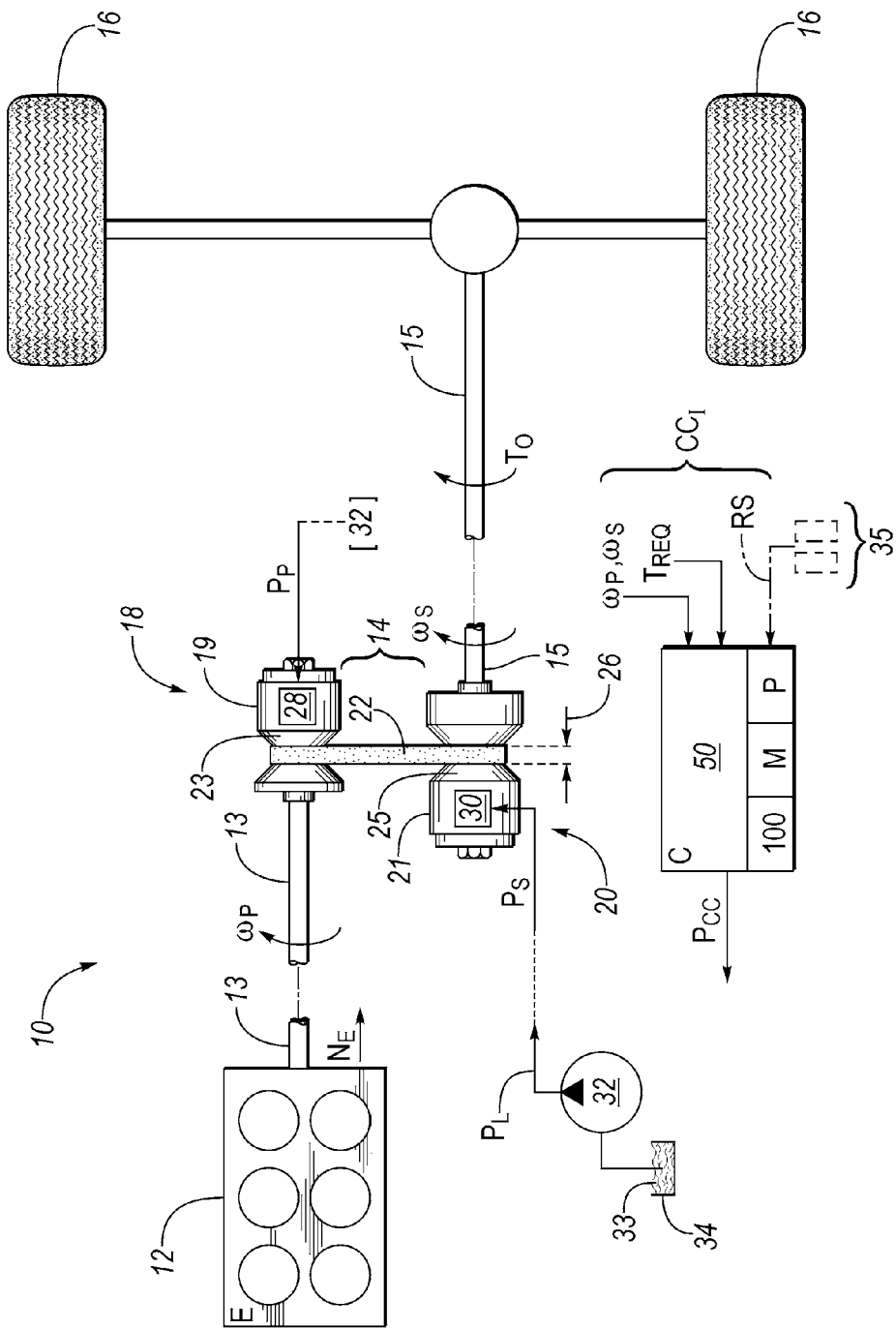
FIG. 1 is a schematic illustration of an example vehicle having an internal combustion engine and a continuously variable transmission (CVT) controlled as set forth herein.

Referring to the drawings, wherein like reference numbers correspond to like or similar components throughout the several figures, an example vehicle 10 is shown schematically in FIG. 1. The vehicle 10 includes a torque generating device 12, shown as an internal combustion engine (E) but which also may be embodied as an electric machine or other suitable device operable for generating output torque. For illustrative consistency the torque generating device 12 will be described hereinafter as an engine 12 without limiting the scope to such a design.

The vehicle 10 also includes a continuously variable transmission (CVT) 14 and a controller (C) 50. As set forth below in further detail with reference to FIGS. 2 and 3, the controller 50 is programmed to proactively increase or stage pressure levels to the CVT 14 ahead of an impending speed ratio change or gear shift of the CVT 14 to a desired speed ratio, doing so according to a method 100. A benefit of the method 100 is that line pressure (arrow $P_L$) to the CVT 14 is not modified unless and until an expected speed ratio change is about to occur, thereby helping to preserve overall powertrain efficiency. A more rapid speed ratio change may also be enjoyed relative to conventional closed-loop CVT control methods.

The engine 12 of FIG. 1 includes an output shaft/crankshaft 13. The crankshaft 13 is connected to the CVT 14, which in turn includes an output shaft 15. The output shaft 15 ultimately delivers output torque (arrow $T_O$) to a set of drive wheels 16 of the vehicle 10. The CVT 14 includes a primary pulley 18 connected to and driven by the crankshaft 13, a secondary pulley 20 connected to the output shaft 15, and a belt 22. The term "belt" as used herein refers to any closed/endless loop of rubber and/or metal suitable for transmitting torque from the primary pulley 18 to the secondary pulley 20, including a loop of chain or a conventional rubber and metal CVT drive belt. The respective primary and secondary pulleys 18 and 20 each have mating halves 19 and 21, respectively, with respective conical faces 23 and 25 defining a variable-width gap 26. The belt 22 is positioned within the gap 26 and rides on the conical faces 23 and 25 as the engine 12 powers the primary pulley 18 at engine speed ($N_E$), which thus acts as an input speed (arrow $\omega_P$) to the primary pulley 18. The secondary pulley 20 rotates as a speed (arrow $\omega_S$).

As is known in the art, the width of the gap 26 may be varied via movement of the mating halves 19 and/or 21 to change the speed ratio of the CVT 14. Therefore, the vehicle 10 of FIG. 1 includes respective first and second actuators 28 and 30 responsive to respective primary and secondary pressure (arrows $P_P$, $P_S$ respectively) to compress the respective primary and secondary pulleys 18 and 20. An example embodiment of the first and second actuators 28 and 30 includes a hydraulic piston/cylinder system, although other linear actuators may be used such as electromechanical devices or pneumatic pistons.

The first actuator 28 acts on a moveable one of the mating halves 19 of the primary pulley 18 in response to application of the primary pressure (arrow $P_P$). Likewise, the second actuator 30 acts on a moveable one of the mating halves 21 of the secondary pulley 20 in response to the secondary pressure (arrow $P_S$). Line pressure (arrow $P_L$) may be provided to the CVT 14 via a fluid pump 32 as shown, with the fluid pump 32 drawing fluid 33 such as oil from a sump 34 and circulating the fluid 33 to the CVT 14 via hoses, fittings, and other suitable fluid conduit (not shown). In one possible embodiment the line pressure (arrow $P_L$) is equal to secondary pressure ($P_S$). However, other embodiments may be envisioned in which the primary and secondary pressures (arrows $P_P$ and $P_S$, respectively) are independent of line pressure (arrow $P_L$).

The controller 50 may be configured as one or more computer devices having memory (M). The controller 50 may include hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. The method 100 may be recorded in memory (M) and executed by the processor (P) in the overall control of the vehicle 10.

The controller 50, which is in communication with the first and second actuators 28 and 30, receives a set of control inputs (arrow $CC_I$) as part of the method 100 described below. The control inputs (arrow $CC_I$) may include the input speed ($\omega_P$) to the CVT 14, i.e., a rotational speed of the primary pulley or the crankshaft 13 as measured by a speed sensor or as reported engine speed from an engine control unit (not shown), and an output torque request (arrow $T_{REQ}$). As is known in the art, the output torque request (arrow $T_{REQ}$) is determined by actions of a driver of the vehicle 10, e.g., via the present throttle request, braking levels, gear state, and the like. In another embodiment the vehicle 10 may include one or more optional shift paddles 35 as shown in phantom, such that a driver of the vehicle 10 requests a shift via a tap of one of the shift paddles 35. In such a design, motion of the shift paddles 35 generates a requested shift signal (arrow RS) as part of the set of control inputs (arrow $CC_I$).

The controller 50 of FIG. 1 also detects a desired ratio change of the CVT 14 in response to the control inputs (arrow $CC_I$) and determines a required shift force for achieving the desired ratio change at a calibrated rate. As will now be explained with reference to FIGS. 2 and 3, the controller 50 ultimately adjusts the primary and/or secondary pressures (arrows $P_P$, $P_S$) whenever the calibrated rate is not achievable, i.e., when the present available shift force is insufficient, doing so via transmitting of a pressure command ($P_{CC}$) to the primary and/or secondary actuators 18 and 20.

Figure 2:
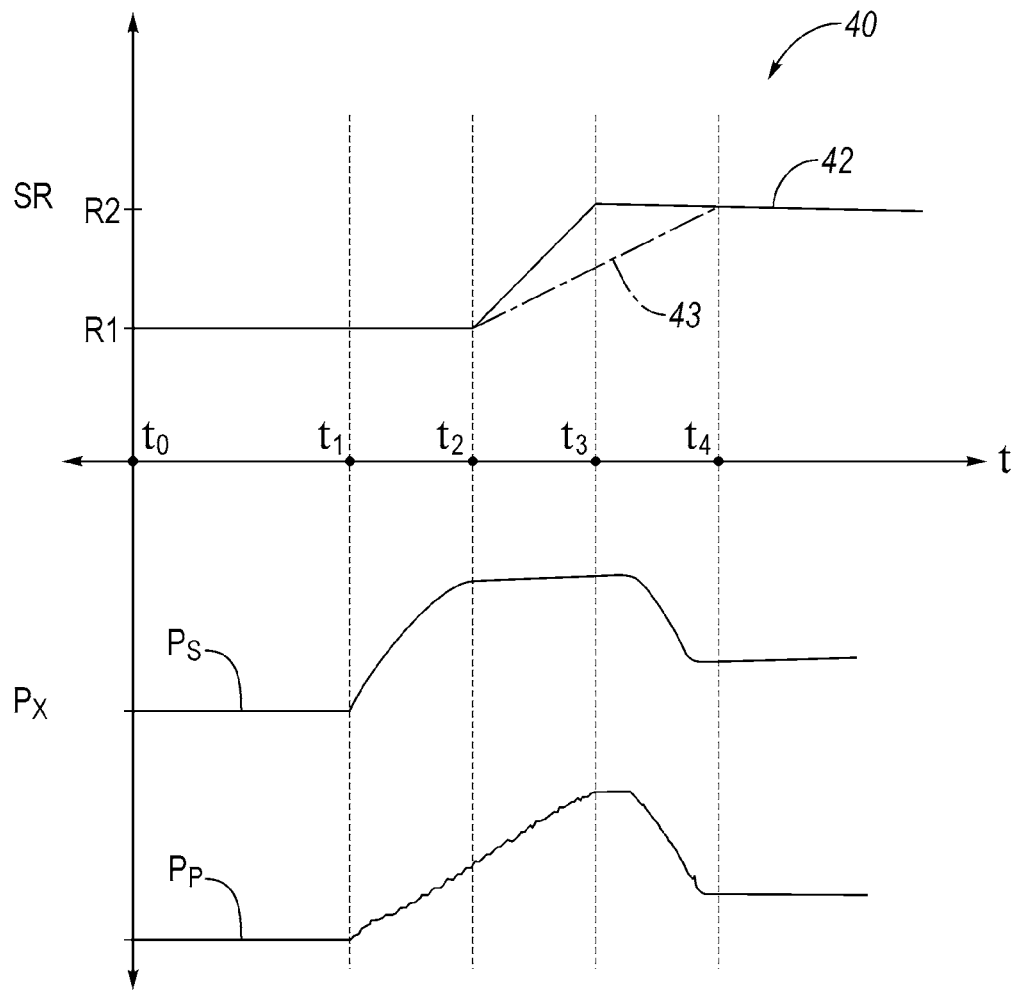
FIG. 2 is a time plot describing a ratio change and associated primary and secondary pressure commands during an example ratio change of the CVT shown in FIG. 1.

Referring to FIG. 2, a time plot of an example set of shift parameters 40 is shown for an example gear ratio change of the CVT 14 shown in FIG. 1. Time (t) is depicted on the horizontal axis while speed ration (SR) and pressures ($P_X$) are depicted on the vertical axis. Trace 42 represents the speed ratio (SR) as it changes from a first ratio (R1) to a second ratio (R2). Traces $P_P$ and $P_S$ represent the respective primary and secondary pressures as described above. The controller 50 operates from $t_0$ to $t_1$ in the first ratio (R1), e.g., 0.5. As the CVT 14 approaches a shift line at $t_1$ upon which the ratio change to the second ratio R2 would ordinarily begin, the controller 50 effectively determines if there is sufficient shift force available at present to achieve a calibrated ratio change rate, represented below as $\dot{R}$. In FIG. 2, trace 43 indicates a trajectory that corresponds to a ratio change rate that is too slow relative to a calibrated goal rate for the shift.

If the available shift force is insufficient, the controller 50 stages the primary and/or secondary pressures ($P_P$, $P_S$) at $t_1$ according to the method 100 via the pressure commands (arrow $P_{CC}$) of FIG. 1 and commences the shift at $t_2$. The shift completes at $t_3$ as opposed to $t_4$ in the example shift of FIG. 2 absent the method 100. The controller 50 may then reduce the primary and secondary pressures ($P_P$, $P_S$) after $t_4$ to a steady-state pressure needed to maintain the new gear state for optimal efficiency. Line pressure (arrow $P_L$) ultimately providing the primary and secondary pressures ($P_P$, $P_S$) is thus not increased unless and until such pressure is actually needed at a higher level. An embodiment illustrating the above approach will now be explained with reference to FIG. 3.

Figure 3:
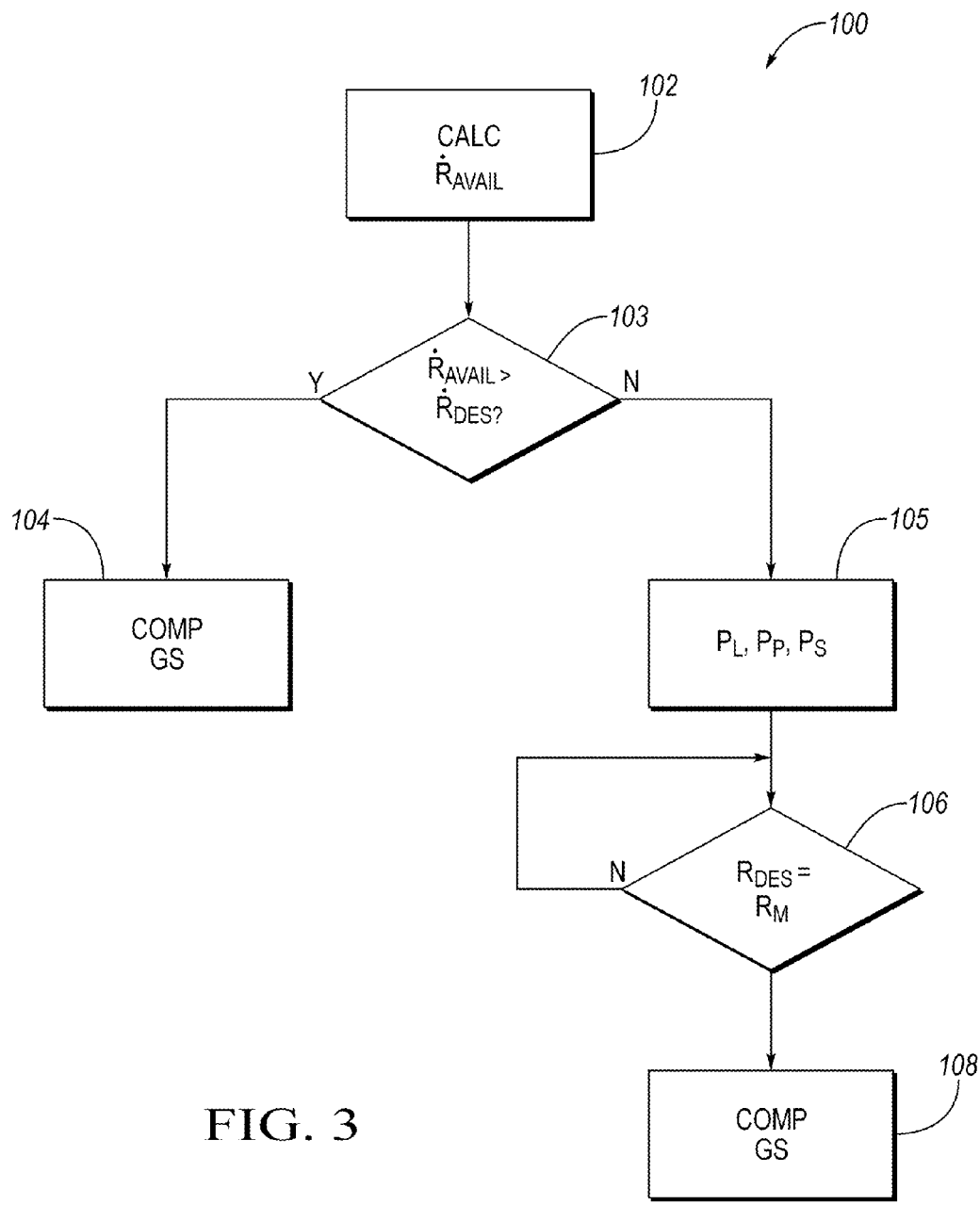
FIG. 3 is a flow chart describing an example embodiment for staging of primary and secondary pressure in the CVT of the vehicle shown in FIG. 1.

Method 100 of FIG. 3 begins with step 102, wherein the controller 50 of FIG. 1 calculates the rate $\dot{R}_{AVAIL}$ at which the CVT ratio can presently change to a desired ratio given the existing shift force:

$$\dot{R}_{AVAIL} = k(SR, \omega_p) \cdot F_{REQ}$$

where k is a calibrated rate change coefficient and SR is the present speed ratio, i.e., $\omega_s/\omega_p$. $F_{REQ}$ may be determined mathematically as follows:

$$[F_p - k_p k_s(SR, TCR) F_s]$$

where TCR is the torque capacity ratio, $F_p$ is the primary force, $F_s$ is the secondary force, and $k_p k_s$ (SR, TCR) is a calibration value determined offline for the particular CVT 14 used in the vehicle 10, modeled, or otherwise determined. For instance, $k_p k_s$ could be determined offline as function of speed ratio (SR) and TCR, again for a given model or design of the CVT 14. Other values other than SR and TCR such as input torque, input speed, temperature, and the like may be used to determined $k_p k_s$, and therefore the above formula is not limiting.

With respect to the primary force (FP) and secondary force (FS), as is known in the art such forces have multiple components in a typical piston system. For instance:

$$F_P = P_P A_P + F_{P,CENT}$$

where $P_P$ is the pressure force on the primary actuator, e.g., a hydraulic piston, AP is the cross-sectional area of the piston, and $F_{P,CENT}$ is the centrifugal force acting on the hydraulic piston. The same components may be considered in calculating the secondary pressure, with an additional component of a calibrated spring force ($F_{SP}$), i.e.:

$$F_S = P_S A_S + F_{S,CENT} + F_{SP}$$

At step 103, the controller 50 of FIG. 1 next compares the calculated available rate $\dot{R}_{AVAIL}$ from step 102 to a calibrated desired rate $\dot{R}_{DES}$ to determine whether the ratio change can presently occur at the desired rate. If the available rate exceeds the calibrated desired rate, the available shift force is determined as being sufficient for completing the desired shift. As a result of such a determination by the controller 50 the method 100 proceeds to step 104. The method 100 otherwise proceeds to step 105.

Step 104, which is reached once the controller 50 of FIG. 1 determines that the available shift force is already sufficient at step 103, entails completing the gear shift (COMP GS) or desired gear ratio change in the typical manner by delivering the required primary and secondary pressures ($P_P$, $P_S$) to the first and second actuators 28 and 30 of FIG. 1 to cause the ratio change. The method 100 begins anew at step 102.

At step 105, the method 100 includes increasing the required line pressure ($P_L$), the primary pressure ($P_P$), and the secondary pressure ($P_S$) for achieving a required shift force ($F_{REQ}$). The method 100 proceeds to step 106 as the calculated pressures are applied.

Step 106 includes determining if the calibrated desired ratio ($R_{DES}$) from step 103 has been achieved. For example, step 106 may entail measuring the current ratio ($R_M$) and determining if the calibrated desired ratio is equal to the measured ratio. Step 106 is continued in a loop with step 105 until the calibrated desired ratio is achieved, at which point the method 100 proceeds to step 108.

Step 108 includes completing the gear shift (COMP GS) initiated at step 105 and then reducing pressures to a calibrated steady-state level as noted above.

Using the method 100 set forth above, the controller 50 can address ratio rate limitations that may be present due to pressure conditions in the vehicle 10 of FIG. 1. The controller 50, when programmed in accordance with the present disclosure, can coordinate the conditions of the pump 32 and/or other pressure system components and the characteristics of any variator components of the CVT 14 to enable a desired ratio change. Powertrain efficiency is preserved by not changing line pressure (arrow $P_L$) or the primary/secondary pressures $P_P$, $P_S$ until an expected simulated gear shift is about to occur.

While the best modes for carrying out the disclosure have been described in detail, those familiar with the art to which this disclosure relates will recognize various alternative designs and embodiments within the scope of the appended claims.

The invention claimed is:

1. A vehicle comprising:
    a torque generating device having an output shaft;
    a continuously variable transmission (CVT) having an output shaft, a primary pulley connected to and driven by the output shaft of the torque generating device, a secondary pulley connected to the output shaft of the CVT, and a belt, wherein the primary and secondary pulleys each have mating halves with conical faces defining a variable-width gap therebetween in which the belt is positioned;
    a first actuator acting on one of the halves of the primary pulley in response to a primary pressure;
    a second actuator acting on one of the halves of the secondary pulley in response to a secondary pressure; and
    a controller in communication with the first and second actuators, wherein the controller is programmed to:
        detect a desired ratio change of the CVT in response to a set of control inputs;
        calculate a required shift force for the desired ratio change;
        determine if the desired ratio change is achievable at a calibrated desired rate based on the calculated required shift force; and
        adjust at least one of the primary and secondary pressures ahead of an execution of the desired ratio change when the calibrated desired rate is not achievable, including transmitting a pressure command to at least one of the first and second actuators.

2. The vehicle of claim 1, wherein the torque generating device is an internal combustion engine and the output shaft of the torque generating device is a crankshaft of the internal combustion engine.

3. The vehicle of claim 1, wherein the set of control inputs includes an input speed of the CVT and an output torque request of the CVT.

4. The vehicle of claim 1, further comprising shift paddles operable for outputting a requested shift signal in response to motion of the shift paddles, wherein the set of control inputs includes the requested shift signal from the shift paddles.

5. The vehicle of claim 1, wherein the first actuator is a hydraulic piston, and wherein the controller is programmed to calculate a centrifugal force acting on the hydraulic piston and to determine the required shift force as a function of the calculated centrifugal force.

6. The vehicle of claim 1, wherein the second actuator has a spring force, and wherein the controller is programmed to determine the required shift force as a function of the spring force of the secondary actuator.

7. The vehicle of claim 1, wherein the controller is programmed to calculate the required shift force for the desired ratio change as a function of a torque capacity ratio (TCR) of the CVT, a primary force of the first actuator, a secondary force of the second actuator, and a calibration value determined offline as function of a speed ratio and the TCR of the CVT.

8. A continuously variable transmission (CVT) comprising:
   an output shaft;
   a primary pulley connectable to and driven by a source of input torque;
   a secondary pulley connected to the output shaft;
   a belt, wherein the primary and secondary pulleys each have mating halves with conical faces defining a variable-width gap therebetween in which the belt is positioned;
   a first actuator acting on one of the halves of the primary pulley in response to a primary pressure;
   a second actuator acting on one of the halves of the secondary pulley in response to a secondary pressure; and
   a controller in communication with the first and second actuators, wherein the controller is programmed to:
      detect a desired ratio change of the CVT in response to a set of control inputs;
      calculate a required shift force for the desired ratio change;
      determine if the desired ratio change is achievable at a calibrated desired rate based on the calculated required shift force; and
      adjust at least one of the primary and secondary pressures ahead of an execution of the desired ratio change when the calibrated desired rate is not achievable, including transmitting a pressure command to at least one of the first and second actuators.

9. The CVT of claim 8, wherein the set of control inputs includes an input speed of the CVT and an output torque request of the CVT.

10. The CVT of claim 8, wherein the set of control inputs includes a requested shift signal from a set of shift paddles.

11. The CVT of claim 8, wherein the first actuator is a hydraulic piston, and wherein the controller is programmed to calculate a centrifugal force acting on the hydraulic piston and to determine the required shift force as a function of the calculated centrifugal force.

12. The CVT of claim 8, wherein the second actuator has a spring force, and wherein the controller is programmed to determine the required shift force as a function of the spring force of the secondary actuator.

13. The CVT of claim 8, wherein the controller is programmed to calculate the required shift force for the desired ratio change as a function of a torque capacity ratio (TCR) of the CVT, a primary force of the first actuator, a secondary force of the second actuator, and a calibration value determined offline as a function of a speed ratio and the TCR of the CVT.

14. A method for staging pressure in a continuously variable transmission (CVT) having an output shaft, a primary pulley connected to and driven by a crankshaft of a torque generating device, a secondary pulley connected to the output shaft, and a belt, wherein the primary and secondary pulleys each have mating halves with conical faces defining a variable-width gap therebetween in which the belt is positioned, a first actuator acting on one of the mating halves of the primary pulley in response to a primary pressure, and a second actuator acting on one of the halves of the secondary pulley in response to a secondary pressure, the method comprising:
   receiving a set of control inputs via a controller of the CVT;
   detecting a desired ratio change of the CVT via the controller in response to the received set of control inputs;
   calculating a required shift force for the desired ratio change;
   determining, via the controller, if the desired ratio change is achievable at a calibrated desired rate based on the calculated required shift force; and
   adjusting at least one of the primary and secondary pressures ahead of an execution of the desired ratio change when the calibrated desired rate is not achievable, including transmitting a pressure command to at least one of the first and second actuators.

15. The method of claim 14, wherein the set of control inputs includes an input speed of the CVT and an output torque request of the CVT.

16. The method of claim 14, further comprising outputting a requested shift signal in response to motion of shift paddles, wherein receiving the set of control inputs includes receiving the requested shift signal from the shift paddles.

17. The method of claim 14, wherein the first actuator is a hydraulic piston, and wherein calculating a required shift force includes calculating a centrifugal force acting on the hydraulic piston.

18. The method of claim 14, wherein calculating the required shift force includes solving a function of a torque capacity ratio (TCR) of the CVT, a primary force of the first actuator, a secondary force of the second actuator, and a calibration value determined offline as a function of a speed ratio and the TCR of the CVT.

* * * * *